3,124,522
ELECTRODIALYSIS PROCESSES AND ELECTRODIALYSIS CELLS

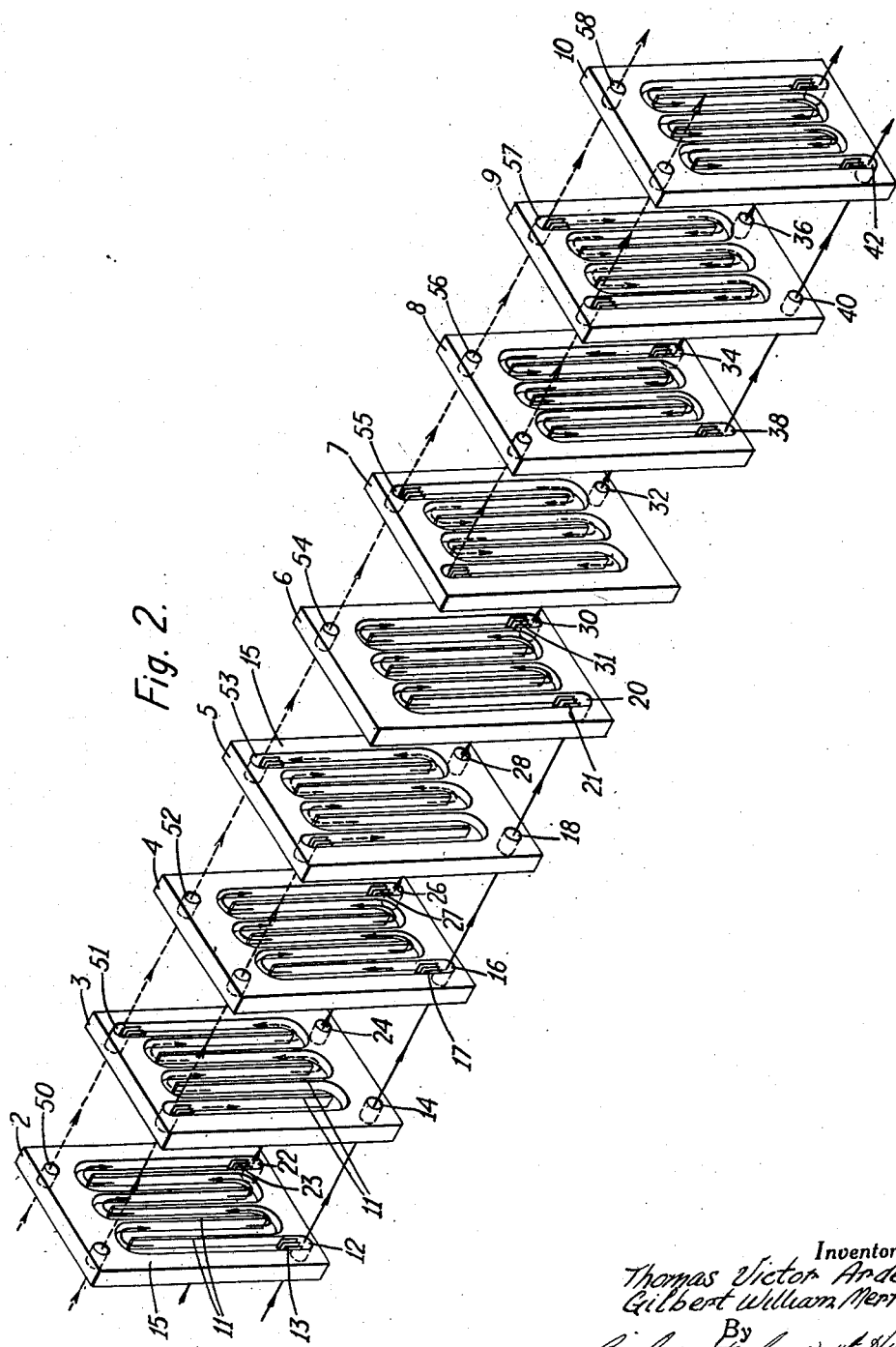

Thomas Victor Arden, London, England, and Gilbert William Merriman, Pontyclun, Wales, assignors to The Permutit Company Limited, London, England
Filed Mar. 21, 1956, Ser. No. 572,959
Claims priority, application Great Britain Mar. 22, 1955
7 Claims. (Cl. 204—301)

Electrodialysis is a well-known process which comprises electrolysing a solution of an electrolyte between two electrodes separated by one or more porous diaphragms. These diaphragms allow passage of the ions under the influence of the applied voltage but tend to prevent the electrolytic products formed at or near the electrodes from mechanically mixing with the electrolyte on the far side of the diaphragm. In this way the electrolytic products are kept separate to a greater or less extent depending on the efficiency of the diaphragms in preventing this mixing of the ions.

In addition to some mechanical mixing, back-migration of the ions composing the electrode products under the influence of the applied voltage also occurs. The porous diaphragms do not stop this, but since ionic permselective membranes have become available it has been possible to do so substantially completely. For example, in the electrodialysis of sodium sulphate use may be made of a cell formed into three compartments by a cation and an anion-exchange diaphragm, the cation-exchange diaphragm being next to the cathode. Then, after passage of current through hte cell substantially pure water is produced in the centre compartment, the sodium and sulphate ions migrating into the cathode and anode compartments respectively. If ordinary porous diaphragms were used hydrogen and hydroxyl ions formed at the electrodes would also migrate and carry current, thus requiring power in addition to that necessary to cause the sodium ions to migrate.

In practice it is desirable to use a cell having as many compartments as possible as in this way the contribution of the electrode- and over-voltage at the electrodes is reduced from a major proportion, as in a three-compartment cell, to a minor proportion of the total voltage drop across the cell. For example, the average voltage drop across each compartment may be 0.3 volt and the electrode- and over-voltage 3 volts. In a three-compartment cell the total voltaeg drop will be 3.9 volts, of which 3 volts or 77% of the total voltage drop is serving no useful purpose so far as movement of ions is concerned. If, however, a fifty-compartment cell is used the total voltage drop will be 18 volts. Again 3 volts is wasted, but in this case the wastage only amounts to some 17% of the total voltage drop.

Accordingly, it will be seen that the larger the number of compartments in the cell the smaller will be the contribution of electrode- and over-voltage. However, a practical limit is put on the size of the cell by the mechanical difficulty of constructing a cell with a very large number of compartments and by the fact that it is inadvisable in apparatus of this type to apply more than about 180 volts of direct current across the electrodes, in order to avoid risks of serious electrical shocks, indeed it is wise to apply no more than about 120 volts. Moreover, when the number of compartments is that which can be worked at this voltage further increase of the number of compartments has substantially no effect on the contribution of the electrode- and over-voltage. From these considerations it is found that a practical minimum on the number of compartments is 80 and a practical maximum 600, although it is preferred to have less than 240 compartments.

Such cells may be used in an electrodialysis process in which two solutions are passed continuously through the sets of alternate compartments of the cell. One solution may be an aqueous solution, for example, brackish water, from which it is desired to remove dissolved electrolytes, and the other solution also brackish water in which the electrolyte removed from the first solution is collected. In this and other electrodialysis processes it is necessary to pass at least one of the solutions through the cell as rapidly as possible in order to prevent the solution remaining static or stagnant in some compartments, to assist in maintaining the solution turbulent in the compartments and to prevent scaling in the compartments.

Now, the flow of either or both of the solutions through the compartments of the cell can be either in series or in parallel. Both methods suffer from disadvantages. If the flow is in series through the compartments the length of path traversed by the solution is so great, particularly when the number of compartments is large, that it is generally impossible to pass the water through the cell at a fast enough rate. Series flow is, however, practicable if the flow need only be slow, as is the case when the solution in question is collecting the electrolyte removed from the other solution. When it is important for the flow rate to be high parallel flow is used. In this case it is difficult, if not impossible, to achieve even distribution of the solution between all the compartments of a cell in which the number of compartments is large. This difficulty of even distribution is aggravated by the fact that the rate of flow, and hence the pressure drop, through each compartment is small. Any tendency to uneven flow results in excessive removal of electrolyte from the solution being treated in those compartments in which there is a tendency for the solution to become stagnant. This leads to the development of a high electrical resistance and a low Coulomb efficiency, as migration of hydrogen and hydroxyl ions through the membranes occurs under these conditions. Both these effects increase the electric power requirements. Moreover, while it is desirable to make the flow as rapid as possible for the reasons outlined above, the more rapidly the solution flows the shorter the time it is in a compartment and, therefore, the less the amount of electrodialysis that can take place. While it should theoretically be possible to achieve complete electrodialysis by increasing the total current flowing through the cell, it is found in practice that the process becomes increasingly less efficient and complete electrodialysis can not be achieved in this way. Accordingly it is common practice to recirculate the solution through the cell for a time sufficient to enable the electrodialysis process to be completed. It has also been proposed to use several cells in series. The use of several cells in series has several serious disadvantages. If, say, 3 identical cells are used in series then the assembly will deliver 3 times the volume of water delivered by 1 in a given time. Since however, the size of the original cell will have been chosen to deliver a certain volume of water economically the 3-unit assembly is too large for this purpose and can not be used economically. If each of the three cells is reduced to one third of its original size by reducing the number of compartments by one third, then the over-voltage in each cell becomes a substantial fraction of the total voltage drop. If on the other hand the size of each cell is reduced by reducing its cross-sectional area, the number of compartments remaining the same, the membranes are used to less effect since a greater fraction of the total cross-sectional area is covered by the gasket edges. Furthermore it is obviously more expensive to construct three cells than one. In any event the problem of even distribution is not solved in this way.

It is an object of this invention to provide an electrodialytic process which surmounts these disadvantages.

It is a further object of the invention to provide a novel construction of electrodialytic cell.

Other objects of the invention will become apparent hereinafter.

We have now discovered that by splitting up the compartments of either or both sets of alternate compartments in a cell having from 80 to 600 compartments separated by alternate cationic and anionic permselective membranes into groups and passing either or both solutions in parallel through the compartments of each group but in series between each group, that we can use an electrically economic cell and at the same time obtain even distribution between the compartments without the necessity of recirculation.

According to this invention one solution passes in parallel through groups of compartments of one set of alternate compartments, the solution on emerging from one group combining and passing to the next group. It is obviously desirable for the number of compartments in each group to be as small as possible, as in this way the most even distribution of the solution is obtained; we prefer that each group should have less than 20 compartments. Further we prefer not to have less than 5 compartments in each group, as if less there are less than this number the length of path traversed by the solution in series through the cell tends to become so high that the rate at which the solution can be passed is too low.

This invention also includes a novel construction of electrodialysis cell broadly defined as comprising from 80 to 600 compartments separated by alternate cationic and anionic permselective membranes and having means for passing a solution in parallel through groups of compartments of one set of alternate compartments and means for combining the solution emerging from one group and passing it to the next group. Preferably the number of compartments in the cell is less than 240 and the number of compartments in each group from 5 to 20.

The alternate cationic and anionic permselective membranes may be held apart by spacers to form the compartments. The spacers can advantageously be integral projections extending from the surface of the membranes. They can also be frames independent of the membranes and surrounding the main area of each membrane through which passage of ions takes place. Integral projections should be coated with electrical insulating material and separate spacers should also be electrically insulating to prevent short-circuiting of the cell. The introduction of liquid into and removal of it from each compartment is conveniently effected by forming conduits by registering holes in the membranes and spacers. Passages are then formed in the spacers to connect the conduits with the compartments. Since the compartments of the two series alternate, there must be a passage from a conduit to a compartment only if liquid should enter that compartment from, or leave it through, the conduit in question. Therefore some of the holes in the spacers must join on to passages and others must not, or, in other words, there must be some passage holes and some plain, or by-pass, holes through which the conduit by-passes compartments.

An example of a cell according to this invention will not be described with reference to the accompanying diagrammatic drawings in which:

FIGURE 2 is an exploded perspective view of part of the cell.

Figure 1:
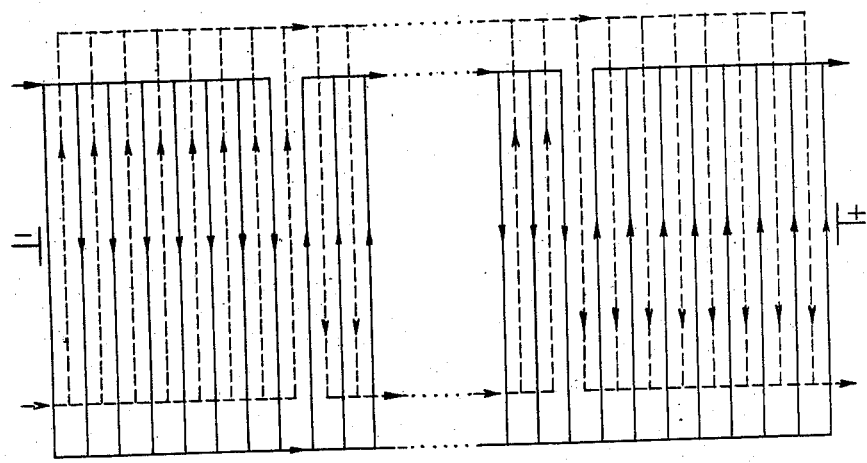
FIGURE 1 shows the way in which two solutions pass through the cell.

Each set of alternate compartments is divided into groups of eight compartments and the two solutions (indicated by full and dotted lines respectively) passed through the compartments as shown.

In FIGURE 1 the membranes and spacers are not shown, but are shown in detail in FIGURE 2. The part of the cell shown comprises cationic permselective membranes 2, 4, 6, 8 and 10 and anionic permselective membranes 3, 5, 7 and 9. Each membrane has a thickened edge 15 and ribs 11 for directing the flow of solution in the compartments. The ribs and edges are coated with electrically insulating material. Accordingly each membrane incorporates its own integral spacer and defines a compartment.

One solution (indicated by full lines) passes through a conduit formed by holes 12, 14, 16, 18 and 20. It passes from this conduit into the compartments defined by the membranes 2, 4 and 6 through passages 13, 17 and 21 in the thickened edges of the membranes, the holes 12, 16 and 20 being passage holes and the holes 14 and 18 by-pass holes. The solution flows through these compartments and is collected in a conduit formed by passage holes 22, 26 and 30 and by-pass holes 24 and 28 leaving the compartments through passages 23, 27 and 31. Accordingly the solution passes in parallel through these compartments. On being collected in the conduit formed by the holes 22, 24, 26, 28 and 30 the solution passes through a by-pass hole 32 in the membrane 7 to the next group of compartments. It enters a conduit formed by holes 34, 36 and 37, and passes through the compartments defined by the membranes 8 and 10 into a conduit formed by holes 38, 40 and 42.

In the same way the second solution (indicated by dotted lines) flows in parallel through the compartments defined by the membranes 3 and 5, being collected in a conduit formed by holes 50, 51, 52 and 53. From this conduit it passes through a hole 54 into a conduit formed by holes 55, 56, 57 and 58. The solution flows from this conduit through the compartments defined by membranes 7 and 9.

It is preferred that both solutions pass through each set of alternate compartments in the same way. It is not, however, necessary that the number of compartments in each group of the two sets is the same. For example, the flow rate in the compartments in which electrolyte is collected can be lower and therefore the number of compartments in the parallel groups can be smaller. Neither is it necessary that the number of compartments in each group for one set is the same. It may be desirable for the number to vary in order to achieve optimum current efficiency. For example, if there are 60 compartments for the solution being electrodialysed, i.e. the cell is made up of 120 compartments, these can be arranged in 6 groups, the first consisting of 20 compartments, the second of 16, the third of 11, the fourth of 7, the fifth of 4 and the sixth of 2.

Use of a cell in accordance with this invention is electrically economic. Whereas if each group formed a separate cell complete with electrodes electrode- and over-voltage would play a major part, according to the invention these are very small. For example, the electrical requirements of one eighty-compartment cell divided into groups of ten for both solutions and four twenty-compartment cells are 27 volts and 36 volts respectively.

A further advantage of this invention is that the electrodialysis process can be completed in a single cell, as passage of the solution through any one compartment, while rapid enough to ensure turbulence and so forth but too rapid for complete electrodialysis, on passage through a further compartment or compartments can carry the process to completion.

If desired, as may be the case with cells having a large cross-sectional area, the solutions may pass in series through a number of cells in each of which the solutions pass in accordance with this invention.

We claim:

1. An electrodialysis apparatus comprising a plurality of juxtaposed multi-membraned groups comprised of a plurality of parallel alternating anion-selective and cation-selective membranes forming alternate diluting and concentrating compartments having inlets and outlets, all the membranes of the apparatus being parallel to each other, manifold conduit means interconnecting the outlets of all the diluting compartments of each group to the inlets of the diluting compartments of another group, thereby combining the effluents of the diluting compartments of a group for passage as influent for the diluting compartments of said other group, and electric current supplying means consisting of an anode at one end of the apparatus and a cathode at the other end of the apparatus for passing a direct current transversely through all the membranes and compartments.

2. An electrodialysis apparatus as claimed in claim 1 comprising from 80 to 600 compartments.

3. An apparatus according to claim 2 in which each group has from 5 to 20 compartments.

4. In an apparatus as claimed in claim 1, manifold conduit means interconnecting the outlets of all the concentrating compartments of each group to the inlets of the concentrating compartments of another group, thereby combining the effluents of the concentrating compartments of a group for passage as influent for the concentrating compartments of said other group.

5. An apparatus as claimed in claim 4 comprising from 80 to 600 compartments.

6. An apparatus as claimed in claim 5 in which each group has from 5 to 20 compartments.

7. An apparatus as claimed in claim 1 in which the membranes are held apart by spacers and the manifold conduit means include registering holes in the membranes and spaces and passages in the spacers connecting the conduits with the compartments.

References Cited in the file of this patent

UNITED STATES PATENTS

| | | |
|---|---|---|
| 2,694,680 | Katz et al. | Nov. 16, 1954 |
| 2,708,658 | Rosenberg | May 17, 1955 |
| 2,758,083 | Van Hoek et al. | Aug. 7, 1956 |
| 2,802,344 | Witherell | Aug. 13, 1957 |

FOREIGN PATENTS

| | | |
|---|---|---|
| 694,223 | Great Britain | July 15, 1950 |
| 726,186 | Great Britain | Mar. 16, 1955 |

OTHER REFERENCES

Arnold et al.: "The Industrial Chemist," July 1953, pages 295–298.